(12) United States Patent
Sethi et al.

(10) Patent No.: US 9,170,808 B2
(45) Date of Patent: Oct. 27, 2015

(54) DYNAMIC CONTAINERIZATION

(71) Applicants: Raman Sethi, Fremont, CA (US);
Anthony Y. Kueh, San Jose, CA (US);
Sanjeet Mall, Heidelberg (DE); Marcus Pridham, Ontario (CA); Marc Waldthausen, Longmont, CO (US);
Scott Strobel, Loveland, CO (US);
Jonathan Li, Ontario (CA); Andrew Lee, Ontario (CA)

(72) Inventors: Raman Sethi, Fremont, CA (US);
Anthony Y. Kueh, San Jose, CA (US);
Sanjeet Mall, Heidelberg (DE); Marcus Pridham, Ontario (CA); Marc Waldthausen, Longmont, CO (US);
Scott Strobel, Loveland, CO (US);
Jonathan Li, Ontario (CA); Andrew Lee, Ontario (CA)

(73) Assignee: SAP SE, Walldorf (DE)

( * ) Notice: Subject to any disclaimer, the term of this patent is extended or adjusted under 35 U.S.C. 154(b) by 89 days.

(21) Appl. No.: 14/074,579

(22) Filed: Nov. 7, 2013

(65) Prior Publication Data
US 2015/0128105 A1  May 7, 2015

(51) Int. Cl.
*G06F 9/44* (2006.01)
*H04L 29/06* (2006.01)
*G06F 9/445* (2006.01)

(52) U.S. Cl.
CPC .. *G06F 8/71* (2013.01); *G06F 8/30* (2013.01); *G06F 8/36* (2013.01); *G06F 8/61* (2013.01); *G06F 9/44521* (2013.01); *G06F 9/44526* (2013.01); *H04L 63/0823* (2013.01)

(58) Field of Classification Search
None
See application file for complete search history.

(56) References Cited

U.S. PATENT DOCUMENTS

| 8,826,145 | B1 * | 9/2014 | Kirkpatrick et al. | 715/746 |
|---|---|---|---|---|
| 2005/0108418 | A1 * | 5/2005 | Bedi et al. | 709/232 |
| 2008/0155254 | A1 * | 6/2008 | Stradling | 713/157 |
| 2010/0125477 | A1 * | 5/2010 | Mousseau et al. | 705/7 |
| 2011/0197175 | A1 * | 8/2011 | Bouz et al. | 717/107 |
| 2011/0258595 | A1 * | 10/2011 | Clevenger | 717/106 |
| 2011/0296514 | A1 * | 12/2011 | Koennecke | 726/9 |
| 2013/0080785 | A1 * | 3/2013 | Ruhlen et al. | 713/176 |
| 2013/0326333 | A1 * | 12/2013 | Hashmi | 715/234 |

OTHER PUBLICATIONS

"Plug-in (computing)"—Wikipedia, Mar. 5, 2012.*

* cited by examiner

*Primary Examiner* — Don Wong
*Assistant Examiner* — Daxin Wu
(74) *Attorney, Agent, or Firm* — Schwegman Lundberg & Woessner, P.A.

(57) ABSTRACT

In an example embodiment, a container is downloaded, the container being an application natively executable by a first operating system of the user device, the container including: a container service including one or more libraries of functions designed by a container designer to natively operate on the first operating system; a browser; container metadata defining functions of the application, the functions compatible with the container service for the first operating system and also compatible with a container service for a second operating system; and a plug-in including one or more additional libraries of functions designed by an entity other than the container designer to perform additional native operations on the first operating system. Then, the container metadata can be executed using the browser, causing function calls to the container service and plug-in and thus controlling native functions of the user device.

19 Claims, 10 Drawing Sheets

DYNAMIC CONTAINERIZATION

TECHNICAL FIELD

This document generally relates to methods and systems for use with computer networks. More particularly, this document relates to dynamic containerization.

BACKGROUND

Mobile applications (also known as "apps") have dramatically increased in popularity with the rise of smartphones and tablets. It is common for these applications to be downloaded by end users from a central repository, sometimes referred to as an "app store" or other location where digital files can be downloaded to user devices. Software developers often create apps and upload these apps to the app store. These apps may be designed as self-contained through a process known as native application development. One drawback to native application development is that it can become difficult to develop applications that operate on multiple different mobile platforms (cross-platform solutions), thus driving up the cost of development for apps that are intended to operate on multiple different mobile platforms.

BRIEF DESCRIPTION OF DRAWINGS

The present disclosure is illustrated by way of example and not limitation in the figures of the accompanying drawings, in which like references indicate similar elements and in which:

FIG. 3 is a flow diagram illustrating a method, in accordance with an example embodiment, of operating an application update plug-in.

FIG. 4 is a flow diagram illustrating a method, in accordance with an example embodiment, of operating an application update plug-in.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

For purposes of this disclosure, a container is a runtime environment executable on a mobile device within which mobile applications can be executed. The container is a native application that is installed on the mobile device. This container may include messaging libraries and a local datastore, as well as a toolkit having a runtime from the native operating system's software development kit (SDK). It may also then embed a browser, which allows developers to build mobile applications using web development as opposed to traditional software development, while still maximizing the power of the native device services. This allows rapid development of mobile workflows across multiple platforms. These types of applications may extend existing enterprise business processes to, for example, a mobile device, so that business process decisions can be made on a mobile device. Mobile device types may include, but are not limited to, a mobile phone, a feature phone, a smartphone, a tablet computer, a mobile computer, a handheld computer, a laptop computer, an in-vehicle or in-appliance device, a personal digital assistant, etc.

In some example embodiments, the container may be designed to allow developers to create applications in open, standards-based protocols such as hypertext markup language (HTML) 5, JavaScript™, and Cascading Style Sheets (CSS). The applications that run in the container may be considered web apps. The web apps may be constructed similarly to an application written for a browser, in that they may contain a web page, with a set of div and form elements that make up the app screens. A set of JavaScript™ files may include the methods for navigating from screen to screen and the functions for accessing data for the screens. A set of CSS files may provide the styling for the screen elements.

Figure 1:
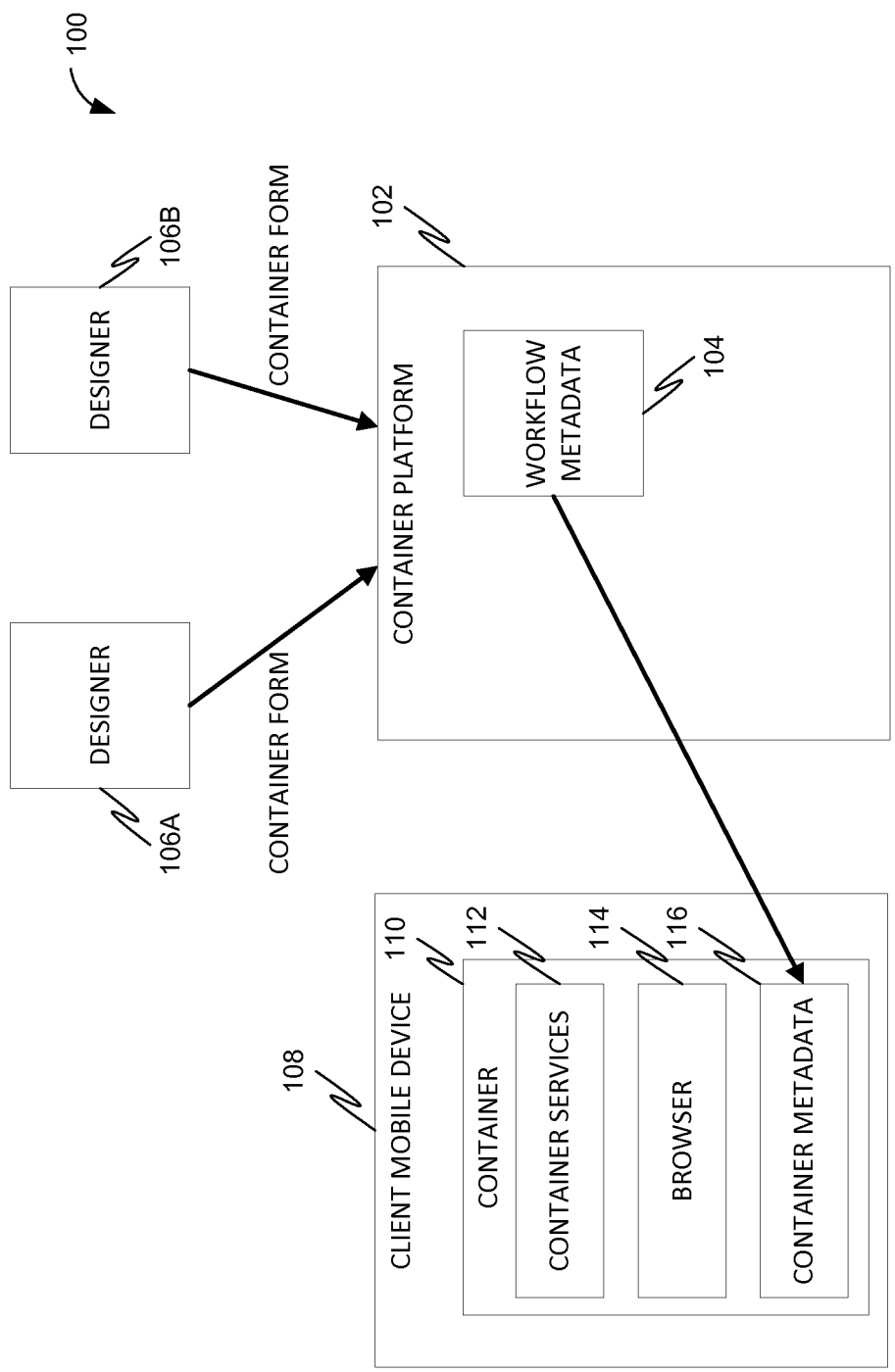
FIG. 1 is a diagram illustrating a system, in accordance with an example embodiment, to provide a container to a mobile device.

FIG. 1 is a diagram illustrating a system 100, in accordance with an example embodiment, to provide a container to a mobile device. The system 100 may include a container platform 102, which may store workflow metadata 104 obtained from one or more designers 106A, 106B. Each designer 106A, 106B may design container forms, including, for example, HTML, CSS, and JavaScript™ files, which may then be sent to the container platform 102 and stored as workflow metadata 104. A client mobile device 108 may then operate a container 110, which includes container services 112, a browser 114, and container metadata 116. The container services 112 may include various libraries of functions, including, for example, storage, messaging, security, and provisioning functions. The browser 114 may create a runtime environment using the container services 112 and the container metadata 116, which is obtained from the workflow metadata 104.

Figure 2:
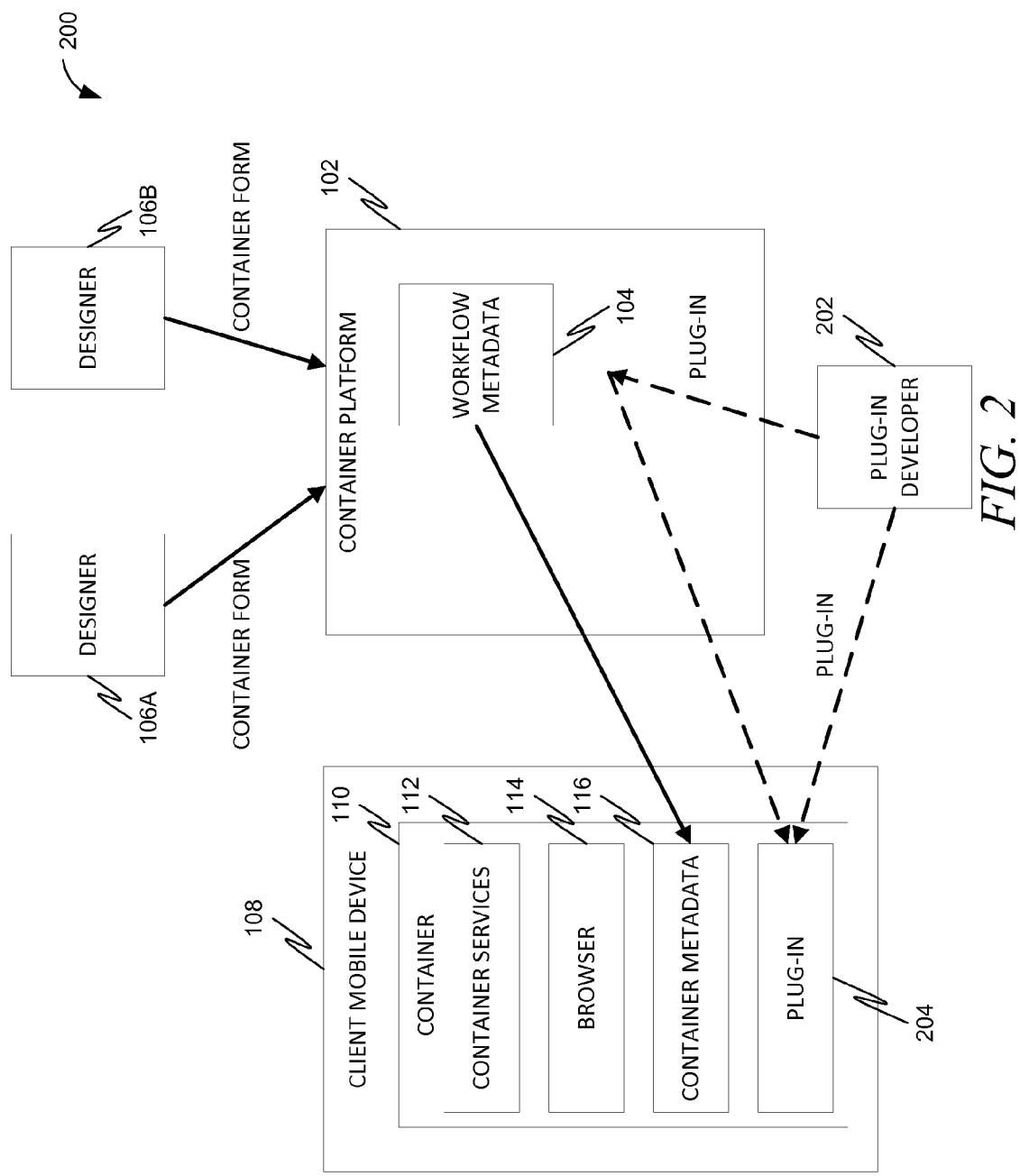
FIG. 2 is a diagram illustrating a system, in accordance with an example embodiment, to provide a plug-in to a container on a mobile device.

In an example embodiment, the container 110 may be dynamically extended or altered through the use of one or more plug-ins. FIG. 2 is a diagram illustrating a system 200, in accordance with an example embodiment, to provide a plug-in to a container 110 on a mobile device. The system 200 may include the container platform 102, which may store workflow metadata 104 obtained from one or more designers 106A, 106B. The system may additionally include a plug-in developer 202. A client mobile device 108 may then operate a container 110, which includes container services 112, a plug-in 204, a browser 114, and container metadata 116. The plug-in 204 may be transmitted to the client mobile device 108 from the plug-in developer 202 via the container platform 102. In an alternative example embodiment, the plug-in developer 202 sends the plug-in directly to the client mobile device 108.

The plug-in 204 may provide functionality not available in the container services 112 that the plug-in developer 202 believes that application designers, such as designers 106A, 106B, may wish to utilize. At runtime, the browser 114 is designed to run both the container services 112 and the plug-in 204, making for a seamless experience for the user. This is accomplished without modifying the other aspects of the container 110, such as the container services 112, browser 114, and container metadata 116.

In an example embodiment, the container services 112 include Javascript™ libraries that provide consistent APIs that can be called the same way on any supported device. In this example embodiment, multiple plug-ins 204 are provided, including plug-ins 204 for application lifecycle management, implementation of a common logon manager, single sign-on (SSO), integrating with server-based push notifications, etc. The plug-ins 204 may utilize a configuration file of the container 110 and extend it for any settings they need for their purposes. For example, if a plug-in 204 needs to extend application configuration items such as sandboxing, application lifecycle, supportability, and so on, it can utilize an additional property name field in the configuration file.

In an example embodiment, a designer 106A, 106B may install the container services 112 and plug-ins, such as plug-in 204 on its own system, in order to be used for creating and testing the container metadata 116 prior to distribution to mobile devices, such as client mobile device 108.

The designer 106A, 106B may then set configuration parameters to configure the ultimate client devices that will run the container 110. This may include, for example, designing back-end connections for selected native and hybrid applications. This may be performed by setting fields defining whether the client device will use a system proxy, whether the client device will rewrite uniform resource locators (URLs), the maximum connections for the client device, and identifying a certificate alias of a specific certificate in the system keystore that is used when making a secure connection to the specified server. Additionally, whitelisted connections can be expanded.

The plug-in 204 may expand the universe of capabilities, services, etc. that are available to applications written in open, standards-based protocols, that operate within the container 110 without altering the container 110 or any of the other plug-ins that may reside within the container 110. Thus, such a plug-in 204 may coexist with any other plug-ins and would not impact the ability of a mobile device 108 to update aspects of the container 110, while minimizing the time required for an application designer to create the application.

Such a plug-in 204 can also make a container 110 more capable, robust, etc. by offering additional or missing features, functions, services, etc. and generally make the container 110 more enterprise-ready, among other things.

Such a plug-in 204 can also provide access to native functionality (e.g., camera, accelerometer, contact list entries) of a mobile device 108. As such, the plug-in serves as something of a bridge between the native or traditional world of mobile device applications, which would have direct access to native functionality such as the camera, and non-native applications. Such a plug-in 204 can abstract, or otherwise hide, various aspects of the complexities associated with accessing and using this native functionality by, for example, exposing a simplified interface for it. Such a plug-in 204 may offer, among other things, enhanced security, limits on available operations, in connecting with, accessing and using native functionality.

Such a plug-in 204 may also provide various performance enhancements that can improve, among other things, the loading time of the application.

Such a plug-in 204 may also support server-controlled management (e.g. provisioning, updating, etc.) of applications as frequently required within an enterprise setting. Among other things the transfer and application of secure incremental updates, patches, etc., transparent to the user, may be supported.

Such a plug-in 204 may also support the flexible, extensible, and dynamic management of activities during any of the different phases (e.g., instantiation, startup, operation, shutdown, etc.) of the lifecycle of an application. Such a plug-in 204 may also address structural weaknesses, deficiencies, etc. that exist within a container 110, such as data access, security, the concurrent operation of multiple applications, etc. through, for example, the offering of additional, or possibly replacement, capabilities and services.

In an example embodiment, the plug-in 204 is a logon plug-in. The logon plug-in provides inter alia a login screen where the user can enter values needed to connect to a server, which stores those values in its own secure data vault. This data vault may be separate from the one provided with other plug-ins. It also provides a way to lock and unlock the application defined by the container metadata 116, so the user can leave sensitive data open in the application. In order to set-up this functionality, the designer 106A, 106B may load the container services 112 and the plug-in 204 on their own system, and then create the application. The designer 106A, 106B may then build a project including the application and the container services 112 and plug-in 204, and then register the application in the container platform 102. The plug-in 204 then provides screen flow application program interfaces (APIs) for the application, including APIs to register the user, unlock secure storage, manage a passcode, change a password, and show registration data.

In an example embodiment, the logon plug-in may contain a series of functions, including, for example, successCallback, errorCallback, applicationID, context, and logonView. SuccessCallback is called when the logon is successful. ErrorCallback is called when the logon fails. ApplicationID is a string defined on a mobile platform server. Context is an object that can be used to override the logon plugin default values. LogonView can be used to point to a custom logon view. Below is example code for logging into an application.

```
function init( ) {
    //Application ID on SMP 3.0
    var appId = "com.sap.flight.kapsel";
    // Optional initial connection context
    // Sets defaults on MAP Login Component
    var context = {
        "serverHost": "10.7.96.217", //SMP 3.0 Server hostname or IP
        "serverPort": "8080", //SMP 3.0 Server port
        "https": "false", //Use HTTPS?
    };
    // Init the Logon component
    sap.Logon.init(logonSuccessCallback, errorCallback, appId,
        context, sap.logon.IabUi);
}
...
// Device is Ready! Call the init function!
document.addEventListener("deviceready", init, false);
function logonSuccessCallback(result) {
    // If result is not null, we have successful login
    if (result) {
```

```
            // Set the application Context
            // This has all the good stuff in it
            applicationContext = result;
            // Read the Airlines from Gateway and display
            readAirlines(applicationContext);
        }
    }
    ...
    function errorCallback(e) {
        alert("An error occurred");
        alert(JSON.stringify(e));
    }
    function readAirlines(applicationContext) {
        //Check if user has been on-boarded
        if (!applicationContext) {
            alert("Register or unlock before proceeding");
        }
        // Get the endpoint, user, password and setup the X-SMP-APPCID
header
        var uri = applicationContext.applicationEndpointURL;
        var user = applicationContext.registrationContext.user;
        var password = applicationContext.registrationContext.password;
        var headers = {"X-SMP-APPCID" :
            applicationContext.applicationConnectionId};
        // Create OData model from URL
        var oModel = new sap.ui.model.odata.ODataModel(uri,
            true,
            user,
            password,
            headers);
    ...
}
```

In another example embodiment, the plug-in 204 is a settings plug-in. The settings plug-in provides the ability to trigger an operation on a server to allow an application to store device and user settings on the client device for later use.

In another example embodiment, the plug-in 204 is a push notification plug-in. The client device sends the server a device type, device model, whether push is enabled, and other push-related statuses. The settings can also use a device token received during device configuration. The server then can use this information to decide what kind of push notification to send (e.g., cloud messaging, push notification service, etc.).

In another example embodiment, the plug-in 204 is an application update plug-in. The application update plug-in provides server-based updates to the application content and manages the process of checking, downloading, and installing updates to the application running within the container 110. The application update plug-in may contain a series of application update methods, including, for example, an application update method that starts the application update process and triggers any required log on process, a reload application method that replaces the application resources with any newly downloaded resources and refreshes the page, an update method that forces an update check, an on update ready method that provides a handler for when an update is available, and an on login required method that provides a handler for log on.

Figure 3:
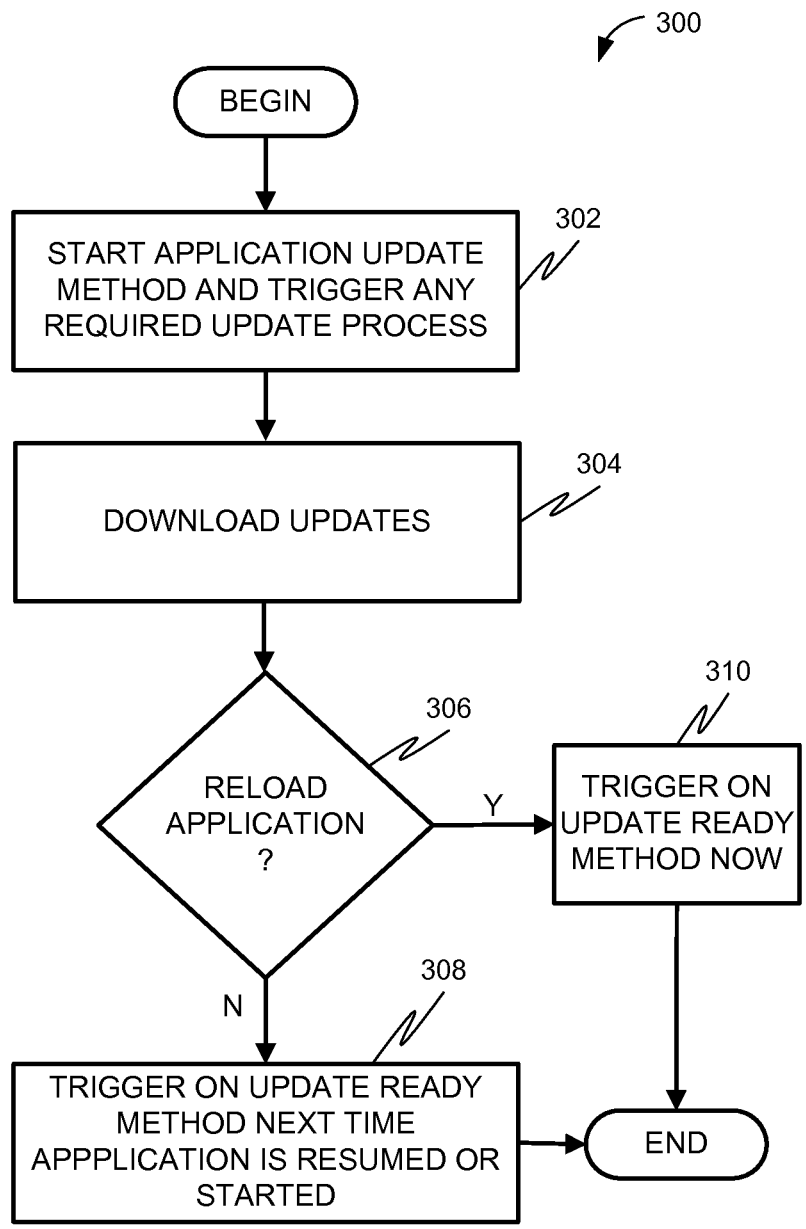

FIG. 3 is a flow diagram illustrating a method 300, in accordance with an example embodiment, of operating an application update plug-in. At operation 302, the application update method starts and triggers any needed update process. At operation 304, the updates are downloaded. At operation 306, a reload application method may ask the user to reload the application. If not, then at operation 308 the on update ready method is triggered the next time the application is resumed or started. If so, then at operation 310, the on update ready method is triggered now.

Figure 4:
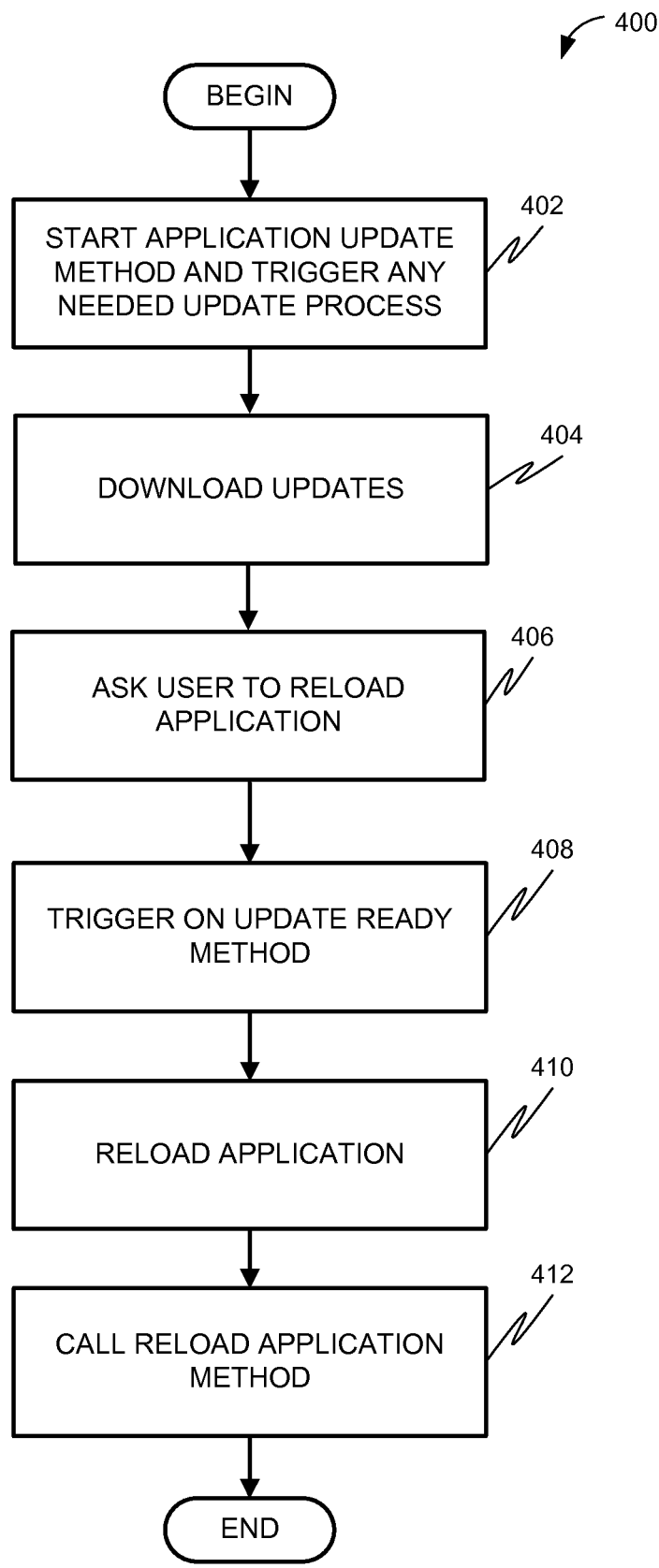

FIG. 4 is a flow diagram illustrating a method 400, in accordance with an example embodiment, of operating an application update plug-in. At operation 402, the application update method starts and triggers any needed update process. At operation 404, the updates are downloaded. At operation 406, a reload application method may ask the user to reload the application. At operation 408, the on update ready method is triggered. At operation 410, the reload application method is called and asks the user to reload the application. Then the user reloads the application. At operation 412 the reload application method is called and the updated application loads.

The updates to the application may either be full or delta. Delta updates only download and install aspects of the application that have been changed since the last update. A full update may be used when, for example, the local revision number is 0, or where the local revision number is unknown or not provided.

In another example embodiment, the plug-in 204 is an authorization proxy plug-in. The authorization proxy plug-in automates the process of accepting certificates, such as Secure Socket Layer (SSL) certificates, returned by a call to a web resource. If users want to send an Asynchronous Jayscript and Extensible Markup Language (AJAX) request, for example, to an HTTPS server and the embedded browser 116 does not support the SSL, then users could utilize the authorization proxy plug-in for this purpose. In another example, if datajs users want to send a request through an HTTPS connection, they can replace a default odata:DefaultHttpClient with one provided by the authorization proxy plug-in.

The authorization proxy methods may act as proxies for requests for the application. There may be two functions for sending requests, get, which takes the parameters function, url, header, success callback, error callback, user, password, timeout, and certificate source, and send request, which takes the parameters function, method, url, header, request body, success callback, error callback, user, password, timeout, and certificate source. Constructor functions can also be used, with each constructor function covering a different type of certificate source (e.g., from file, from store, etc.).

Below is a table of example platform dependent methods, error codes, and object definitions. Its implementation may be platform specific, so every platform can provide its own version of the code.

| | |
|---|---|
| CertificateFromFile (path, password, certificateKey) | Create a certificate descriptor for certificate from files. Calling this method does not immediately load the certificate. path: path of the keystore file; password: password of the keystore; certificateKey: certificate key of the certificate in the keystore, which is the alias in java utility keytool. |
| CertificateFromAfaria (cn, challengeCode) | Create a certificate descriptor for certificate from mobile device management server. Calling this method does not immediately load the certificate. |

| Method | Description |
|---|---|
| CertificateFromStore (certificateKey) | cn: Common name of the certificate; challenge Code: challenge code to mobile device management server; Create a certificate descriptor for certificate from files. Calling this method does not immediately load the certificate. certificateKey: certificate key of the certificate in the system keystore, which is the alias in java utility keytool. |
| deleteCertificateFromStore (certificate Key) | delete cached certificate from keychain. client will always try the cached certificate first if it is available, before requesting the certificate from mobile device management server or loading the certificate from file system. In case the cached certificate is no longer valid, use this method to delete it from keychain |
| get (url, header, successCB, errorCB, userId, password, timeout, certSource) | Send a HTTP request of GET method. This one is more commonly used. url: the full url in formant https://...[:port]; header: header of the request in JSON Object. successCB: callback method when succeeded. Its parameter is a string encoded JSON object with three fields {status: number; headers: JSON object with string fields; responseText: Optional if the requested data is text; responseBase64: Optional if the requested data is binary }. Callers must provide this method otherwise an exception will be thrown out; errorCB: callback method when failed. Its parameter is an object with fields {errorCode: number; description: string; nativeErrorCode: number}. Callers must provide this method otherwise an exception will be thrown out; userID: (Optional) for basic authentication; password: (Optional) for basic authentication; timeout: (Optional) in seconds. certSource: (Optional) The JavaScript certificate description object. Returns: A JavaScript object that contains an method abort( ) to abort the current connection. |
| sendRequest (method, url , header, requestBody, successCB, errorCB, userId, password, timeout, certSource) | Send a generic HTTP request to the server. url: see get (...) . header: see get (...) . requestBody: data to be sent to server with the request. It's a string value; successCB: see get (...) . errorCB: see get (...). userID: see get (...). password: see get (...). timeout: see get (...). certSource: see get (...). Returns: see get (...). |
| ERR_UNKNOWN | The operation failed with unknown error. |
| ERR_INVALID_PARAMETER_VALUE | The operation has invalid parameter. |
| ERR_MISSING_PARAMETER | The operation failed because of missing parameter. |
| ERR_NO_SUCH_ACTION | There is no such cordova action for the current service. |
| ERR_FILE_CERTIFICATE_SOURCE_UNSUPPORTED | Certificate from file keystore is not supported on current platform. |
| ERR_SYSTEM_CERTIFICATE_SOURCE_UNSUPPORTED | Certificate from system keystore is not supported on current platform. |
| ERR_AFARIA_CERTIFICATE_SOURCE_UNSUPPORTED | Certificate from mobile device management server is not supported on current platform. |
| ERR_CERTIFICATE_ALIAS_NOT_FOUND | The certificate with given alias could not be found. |
| ERR_CERTIFICATE_FILE_NOT_EXIST | The certificate file could not be found. |

| | -continued |
|---|---|
| ERR_CERTIFICATE_INVALID_FILE_FORMAT | Incorrect certificate file format. |
| ERR_GET_CERTIFICATE_FAILED | Failed in getting certificate. |
| ERR_CLIENT_CERTIFICATE_VALIDATION | The provided certificate failed validation on server side. |
| ERR SERVER CERTIFICATE VALIDATION | The server certificate failed validation on client side. |
| ERR_SERVER_REQUEST_FAILED (−110) | (exception message reported by httpUrlConnection, the native code should contain the specific error information) |
| ERR_HTTP_TIMEOUT | Timeout error while connecting to the server. |

To call a datajs API with mutual authentication, instead of a request URI string, users may pass the request object which includes both the request URI string and client certificate description. The following code is an example implementation of this:

```
function OData_update(server, cert)
{
    var length = 0;
    var updateUri = server + "/example.svc/Categories(1)";
    OData.read({ requestUri: server + "/example.svc/Categories",
certificateSource : cert},
        function (data, response) {
            alert("length " + data.results.length);
            length = data, results, length;
            if ( length > 0)
            {
                var updateRequest = {
                    requestUri: updateUri,
                    certificateSource : cert,
                    method: "PUT",
                    data:
                    {
                        Picture: new Date( ).getTime( ),
                        Description: "Update Record",
                        CategoryName: "Updated Category",
                        CategoryID: 1
                    }
                };
                OData.request(updateRequest,
                    function (data, response) {
                        alert("Response " +
                            JSON.stringify(response));
                    },
                    function (err) {
                        alert(" Error occurred " +
                            err.message);
                    }
                );
            };
        },
```

When handling client certificate authentication, if an error happens, the error information may be stored locally, and the request continued. When the server response comes, when calling the plugin successcallback method, the stored error information may be stored into the plugin's result's json object as an item with the key of "error". The "error" item's value is a json object containing the error code, error message and optional native error code fields.

If the local stored exception is available, and the http connection failed and the client is unable to get any server response, then when calling the plugin onerrorcallback method, the stored local exception information to can be returned to Javascript™, including error code, error message, and native error code. Two example reasons to do so may be:

1. Even if an authentication error happens, the https proxy can still get the response from the server, as the server response may contain additional information about the error and where to get help to fix it 2. The server can be set to require or allow a client certificate. If it requires a certificate, then the request can fail if the client fails to provide the certificate. If it allows a certificate, the request can still succeed even if the client fails to provide the certificate. However, when a client handles the certificate request, it does not know whether the server side settings are ALLOW or REQUIRE. So, in order to handle the ALLOW setting properly, even if the client fails to get a certificate, it should not abort the request.

In an example embodiment, user permissions may be added to a manifest file of an operating system operating on the client. The following is an example of such permissions being added:

```
<manifest xmlns:android="http://schemas.android.com/apk/res/
android"
    package="smp.tutorial.android"
    android:versionCode="1"
    android:versionName="1.0" >
    <uses-sdk
        android: minSdkVersion="8"
        android:targetSdkVersion="15" />
<uses-permission android:name="android.permission.INTERNET">
<uses-permission
android:name="android.permission.WRITE_EXTERNAL_STORAGE">
<uses-permission
android:name="android.permission.ACCESS_NETWORK_STATE">
    <application>
        <activity>
            <intent-filter>
                <action />
                <category />
                <data />
            </intent-filter>
                <meta-data />
            </activity>
        </application>
</manifest>
```

In an example embodiment, cookies may be added to a request for authorization, using the header object that is passed to the get/send request functions. The cookie name and value can be set in this way, although other pieces of the cookies, such as domain, path, etc. can be set automatically based on the URL the request is made against. The cookie may be treated as a session cookie and sent on future requests as appropriate. The API examples below show an example of how to set a cookie with the header object:

```
// Integrate datajs with HTTPS proxy
    sap.AuthProxy.generateODataHttpClient( );
// Certificate
    from file fileCert = new
sap.AuthProxy.CertificateFromFile("mnt/sdcard/cert.p12",
```

```
"password", "certKey");
// Certificate from
    system key manager sysCert = new
sap.AuthProxy.CertificateFromStore("certKey");
// Certificate from Afaria
afariaCert = new
sap.AuthProxy.CertificateFromAfaria("commonName", "challengeCode");
// Forcefully trust unsigned certificates. For test environment only.
    (since the test server has a self-signed certificate)
    cordova.exec(successCallback, failureCallback, "AuthProxy",
"___TrustAllServers___", [true]);
var successCallback = function( result ){
    if ( result.status === 200 ) {
        alert("success\!
    Response text: " + result.responseText );
    } else {
        alert("Not success, response status:
        " + result.status);
    }
}
var failureCallback = function( error ) {
    alert("Error! Code: " + error.errorCode + "\n" +
error.description + "\nNative error code: " +
error.nativeErrorCode );
}
// basic HTTP get example
    sap.AuthProxy.get("http://www.example.com/stuff/etc",
(header: "test header value"}, successCallback, failureCallback);
// basic auth
    sap.AuthProxy.sendRequest("POST", "http://www.example.com/
stuff/etc", null, null, successCallback, failureCallback, "myname",
"mypassword");
// using file cert
    sap.AuthProxy.sendRequest("PUT", "http://www.example.com/
stuff/etc", null, null, successCallback, failureCallback, null,
null, null, fileCert);
// using system cert
    sap.AuthProxy.get("http://www.example.com/stuff/etc", null,
successCallback, failureCallback, null, null, null, sysCert);
// using Afaria cert
    sap.AuthProxy.get("http://www.example.com/stuff/etc", null,
successCallback, failureCallback, null, null, null, afariaCert);
// setting a cookie with a request
var header = (cookie:
"customCookieName=customCookieValue;anotherName=AnotherValue"};
sap.AuthProxy.sendRequest("POST", "http://www.example.com/stuff/
etc", header, null, successCallback, failureCallback);
// OData example. You must include the datajs-1.0.3.js file. Then
doing OData stuff with datajs is almost exactly the same, but
// you can add a certificate to a request.
OData.defaultHttpClient = sap.AuthProxy.generateODataHttpClient();
var createRequest = {
    requestUri: "http://www.example.com/stuff/etc/example.svc",
        certificateSource : fileCert,
    user : "username",
    password : "password",
    method : "POST",
    data:
    {
        Description: "Created Record",
        CategoryName: "Created Category"
    }
}
OData.request( createRequest, successCallback, failureCallback );
```

In another example embodiment, the plug-in 204 is a logger plug-in. The logger plug-in allows the developer to log messages, by calling one or more methods in the logger plug-in. This may be accomplished by providing the ability to write entries to a local log, which, under developer control, can be uploaded to the mobile platform server for analysis.

Figure 5:
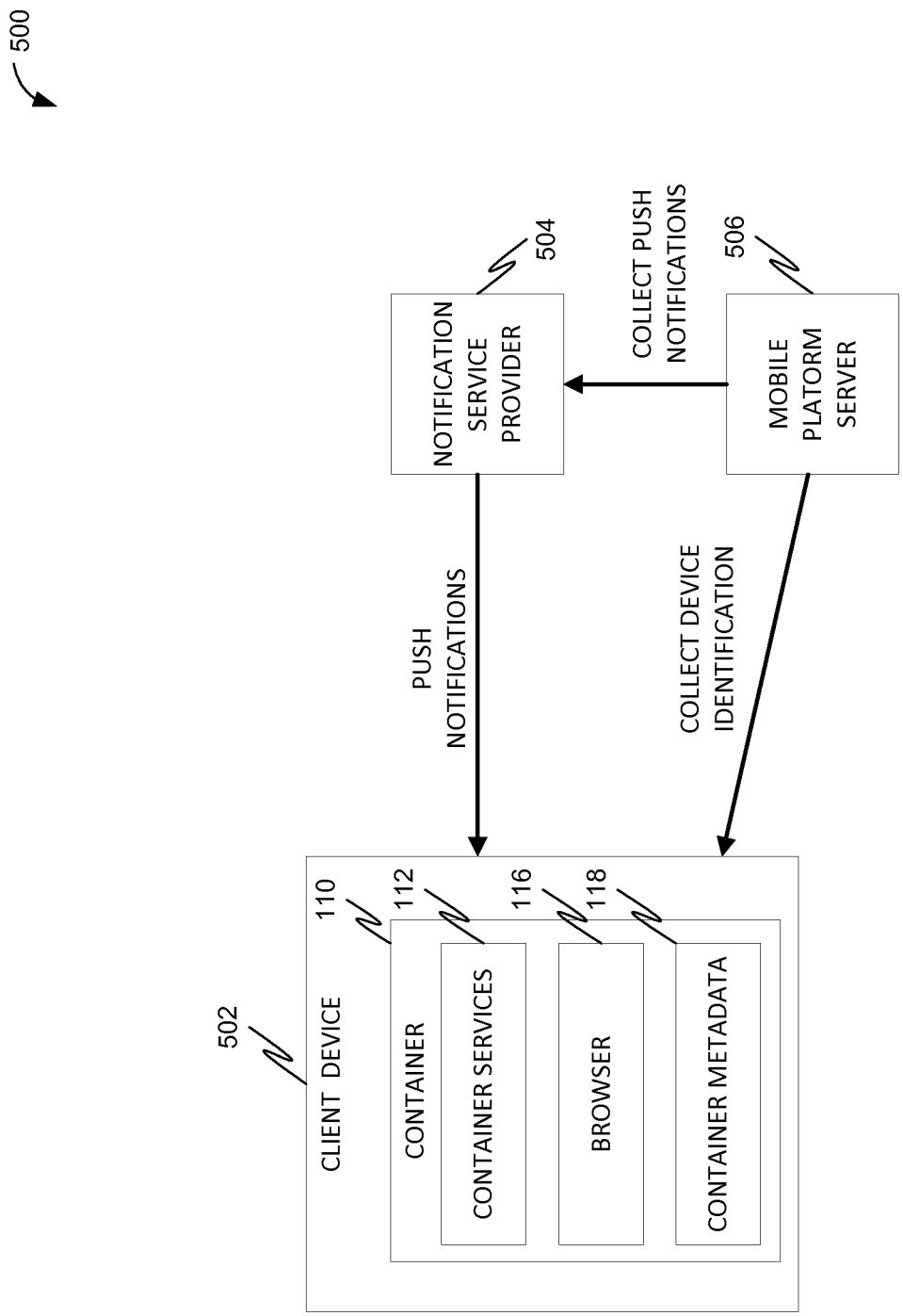
FIG. 5 is a diagram illustrating a system, in accordance with an example embodiment, of push notification.

In another example embodiment, the plug-in 204 is a push notification plug-in. The push notification plug-in enables notification capability for applications. FIG. 5 is a diagram illustrating a system 500, in accordance with an example embodiment, of push notification. The system 500 includes the client device 502, running a container 110, and which receives push notifications, a notification service provider 504 that sends the push notifications, an a mobile platform server 506, which collects device identifications from the clients and push notifications through the notification service provider 504. The push notification plug-in allows developers to enroll applications for notification with notification registration, as well as to receive and process incoming notifications for applications. This plug-in 204 can also support background notification processing.

An API may be provided that allows developers to push data to the applications. In an example embodiment, the mobile platform server 506 pushes messages to a push server through a RESTful API, which in turns delivers the push message to a user agent, which then provides execution instructions for the application. The user agent then delivers the push message to the designated application.

The push API tasks include registering and unregistering a push notification, push notification handling, push notification configuration, and error message handling.

When a developer registers the application with the notification service provider 504, a device or registration identification is sent to the mobile platform server 506. When a push request is processed, that information is then used to target specific applications running on individual devices.

Figure 6:
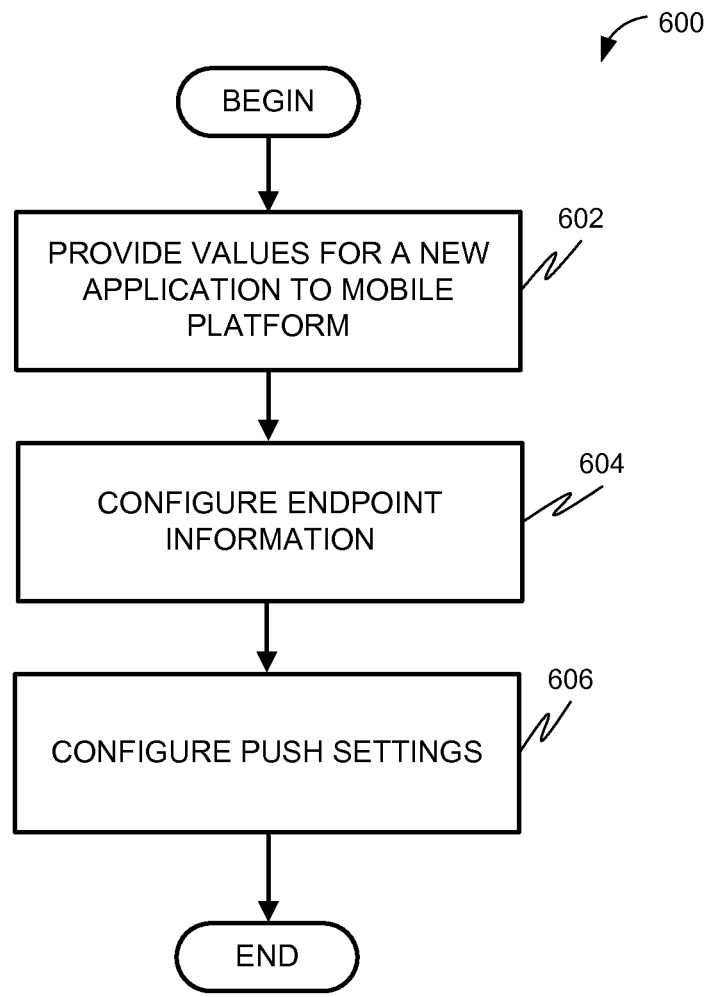
FIG. 6 is a flow diagram illustrating a method, in accordance with an example embodiment, of configuring push messaging on a mobile platform server.

FIG. 6 is a flow diagram illustrating a method 600, in accordance with an example embodiment, of configuring push messaging on a mobile platform server. This method may be performed, for example, by a designer 106A or 106B. At operation 602, values for a new application are provided to the mobile platform. These values may include, for example, ID, Name, Vendor, Version, Type, and Description. ID is a unique identifier for the application. Name is a name for the application. Vendor is a name of the vendor that developed the application. Version is the application version number. Type defines the type of the application, including native, hybrid (container-based), and metadata-driven. At operation 604, the endpoint (client device 504) information may be configured. At operation 606, push settings may be configured. Once the client device 504 enables the ability to receive push notifications, the notifications can then be received. When a device token is returned from the push service provider, a setting exchange plug-in API may be called automatically and implicitly to create a new application connection.

In another example embodiment, the plug-in 204 is a storage plug-in. The storage plug-in provides secure, encrypted, on-device storage. The storage plug-in API methods may be asynchronous, and may include listener and callback functions. Each storage function may be associated with a list of key and value pairs when it is created. The storage plugin may work asynchronously. The storage plug-in may first be used to create an encrypted storage object. Then, various callback functions can be used to store the actual data. A setItem function may be used in this regard, specifying a key, value, successCallback, and errorCallback). For example:

```
storage.setItem(key, value, storageSuccessCallback,
   storageErrorCallback);
function storageSuccessCallback( ) { console.log("Success");}
function storageErrorCallback(errorInfo) {
    alert("Could not read data - " + errorInfo.message);
}
```

Additional functions can be used to clear all data from the storage, remove a key value for storage, and get a number of values stored, for example.

The following is an example use case for a container 110 utilizing specialized plug-ins 204.

Banks and city and state governments have a common application theme across those organizations. Each of them have a need to deliver multiple mobile applications to their constituents and customers, but the complexity of developing and distributing multiple apps (often one for each department or division) is daunting.

Traditionally, any organization looking to enable different departments or business units to deliver mobile applications to end-users delivered those applications separately—a different application (and associated icon on the device home screen) for each use. Banks, for example, could have a different application for managing personal checking and savings accounts, potentially others for financial management, mortgage, credit cards, insurance and more. City or county governments could have an app for garbage collection, utilities (water, electric), taxes, concerts, parks, community service and much more. Colleges and universities would have an app for schedules, athletics, alumni, a book store and more.

What these organizations need is a single mobile application that has the ability to be provisioned with multiple sub-applications (with each sub-application potentially created by separate parts of the organization).

Unlike the requirements for enterprise applications, these applications need to be self-provisioned by the end-user rather than managed by corporate IT. Users would need the ability to login to a web portal (or do the same in-app—it's better to do this from within the app) and select the different department or divisional apps they want provisioned on their device. With the mobile application already on the device, after making their selections (adding or removing sub-apps from their profile) the next update from the server makes sure that the selected apps are added, appropriate apps are removed and, of course, that the latest versions of all sub-apps are on-device.

The solution to this particular problem is a modified version of the hybrid web container application with some new, hosted back-end infrastructure needed for the customer organization to manage the list of available applications that can be provisioned into the container 110. The back-end infrastructure may be, for example, a consumer cloud offering.

Instead of apps being pre-built and available to sell to customers, the app is a generic, empty container 110 that is simply branded for the organization (city, county, bank or whatever) and deployed into the appropriate mobile device platform's app store(s). The application can be deployed empty or deployed with some common content, such as a department contact list or customer service/311 link, so users have something to look at as they wait for their sub-apps to provision. The sub-apps themselves can either be pre-built (for some common apps customers will want) by a mobile platforms or partners and sold to customers, such as banks or government agencies, or built by the customers themselves.

Since this is a hybrid application approach, the apps are built using standard, out of the box HTML5 plus the traditional and mobile platform-supplied APIs that developers of sub-apps can use to extend an application beyond what is supported by HTML5. Each application may need to somehow look and feel like the other apps from the same organization, but that can be easily accommodated through the creation of custom, organization-specific CSS that is distributed to developers (or applied to existing pre-built apps).

Some users would have many sub-apps installed, others would have just a few—but there would be a tailored environment for each user.

Existing server infrastructure already supports push requests, so the consumer hybrid container 110 provides organizations with the ability to push alerts, reminders and even specials or promotions to users. The container 110 is location aware, so there's value-add services that can be added around where the user is located. This becomes an ATM or branch finder for banking applications, a nearest park capability for a city or county government and a nearest open parking space feature for a university application.

Amber alerts, severe weather alerts, and reminders about off-cycle garbage pick-up days can be provided easily and efficiently. Since the app may have the user's email address or phone number (easily retrieved from the device), the application could even support specific alerts tailored for the particular user, such as whether tax payments are due, credit card or utility payment due, etc. An app could push an alert to a device that reminds the user of purchased tickets for a community event. An app could proactively alert the user if the event is cancelled because of pending severe weather or unexpected events. The possibilities are endless for this type of application.

Figure 7:
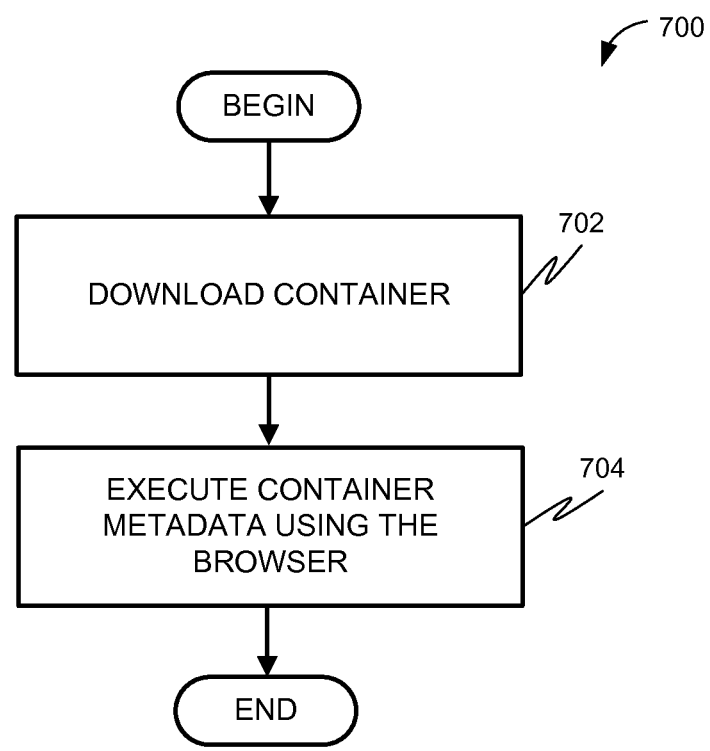
FIG. 7 is a flow diagram illustrating a method, in accordance with an example embodiment, of operating a user device.

FIG. 7 is a flow diagram illustrating a method 700, in accordance with an example embodiment, of operating a user device. At operation 702, a container 110 may be downloaded. The container 110 may be an application natively executable by a first operating system of the user device. The container 110 may include a container service 112 including one or more libraries of functions designed by a container 110 designer 106A and 106B to natively operate on the first operating system. The container 110 may also include a browser 116. The container 110 may also include container metadata 118 defining functions of the application, the functions compatible with the container service 112 for the first operating system and also compatible with a container service 112 for a second operating system. The container 110 may also include a plug-in 204 including one or more additional libraries of functions designed by an entity other than the container 110 designer 106A and 106B to perform additional native operations on the first operating system. At operation 704, the container metadata 116 may be executed using the browser 114, causing function calls to the container service 112 and plug-in 204 and thus controlling native functions of the user device.

Figure 8:
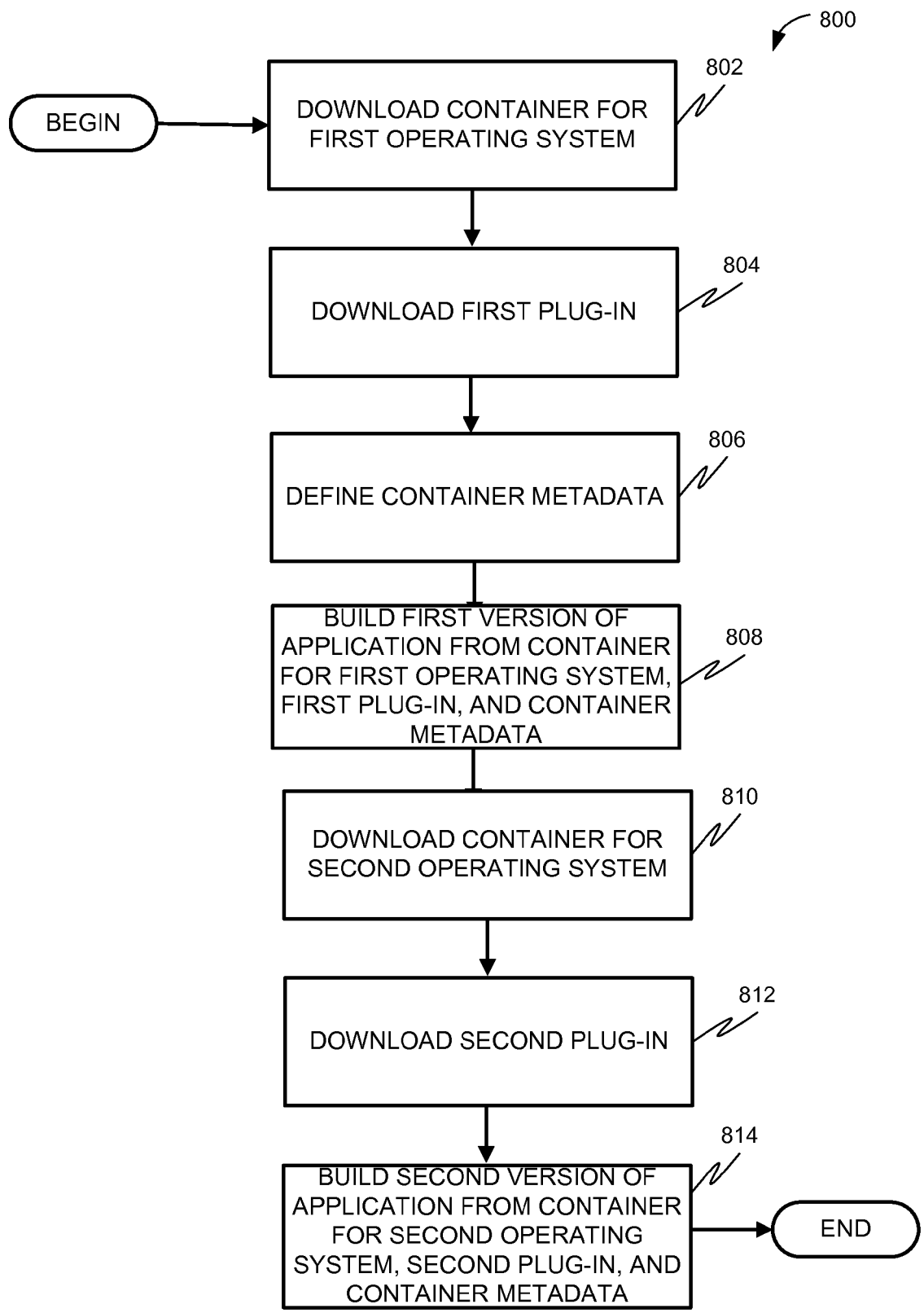
FIG. 8 is a flow diagram illustrating a method of designing an application to be executed on user devices having different operating system.

FIG. 8 is a flow diagram illustrating a method 800 of designing an application to be executed on user devices having different operating systems. At operation 802, a container 110 for a first operating system may be downloaded. The container 110 may include a container service 112 including one or more libraries of functions designed by a container 110 designer 106A and 106B to natively operate on the first operating system, and a browser 114. At operation 804, a first plug-in 204 is downloaded. The first plug-in 204 may include one or more additional libraries of functions designed by an entity other than the container 110 designer 106A and 106B to perform additional native operations on the first operating system.

At operation 806, container metadata 116 specifying functions on the application and containing calls to the libraries in the container service 112 for the first operating system and the first plug-in 204 is defined. At operation 808, a first version of the application is built from the container 110 for the first operating system, the first plug-in 204, and the container metadata 116.

At operation 810, a container 110 for a second operating system is downloaded. The container 110 for the second operating system may include a container service 112 including one or more libraries of functions designed by the container 110 designer 106A and 106B to natively operate on the second operating system, and a browser 114. At operation 812, a second plug-in 204 is downloaded, the second plug-in 204 including one or more additional libraries of functions designed by an entity other than the container 110 designer 106A and 106B to perform additional native operations on the second operating system. At operation 814, a second version of the application is built from the container 110 for the second operating system, the second plug-in 204, and the container metadata 116.

Example Mobile Device

Figure 9:
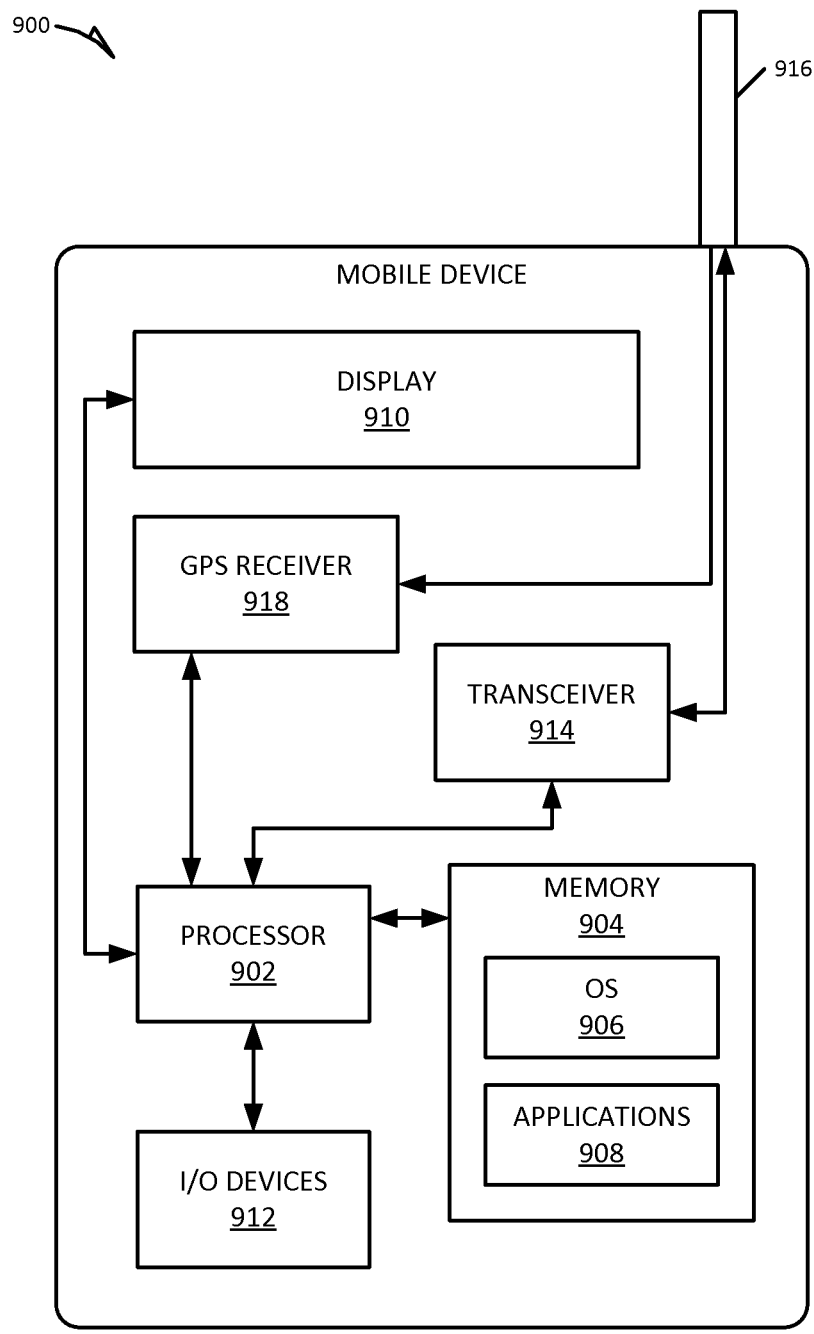
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as application programs 908, such as a mobile location enabled application that may provide LBSs to a user. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Modules Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 902 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 902 or other programmable processor 902) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 902 configured using software, the general-purpose processor 902 may be configured as respective different hardware-implemented modules at different times. Software may accordingly configure a processor 902, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors 902 or processor-implemented modules. The performance of certain of the operations may be distributed among the one or more processors 902, not only residing within a single machine, but deployed across a number of machines. In some example embodiments, the processor 902 or processors 902 may be located in a single location (e.g., within a home environment, an office environment or as a server farm), while in other embodiments the processors 902 may be distributed across a number of locations.

The one or more processors 902 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 902, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 902 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 902), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
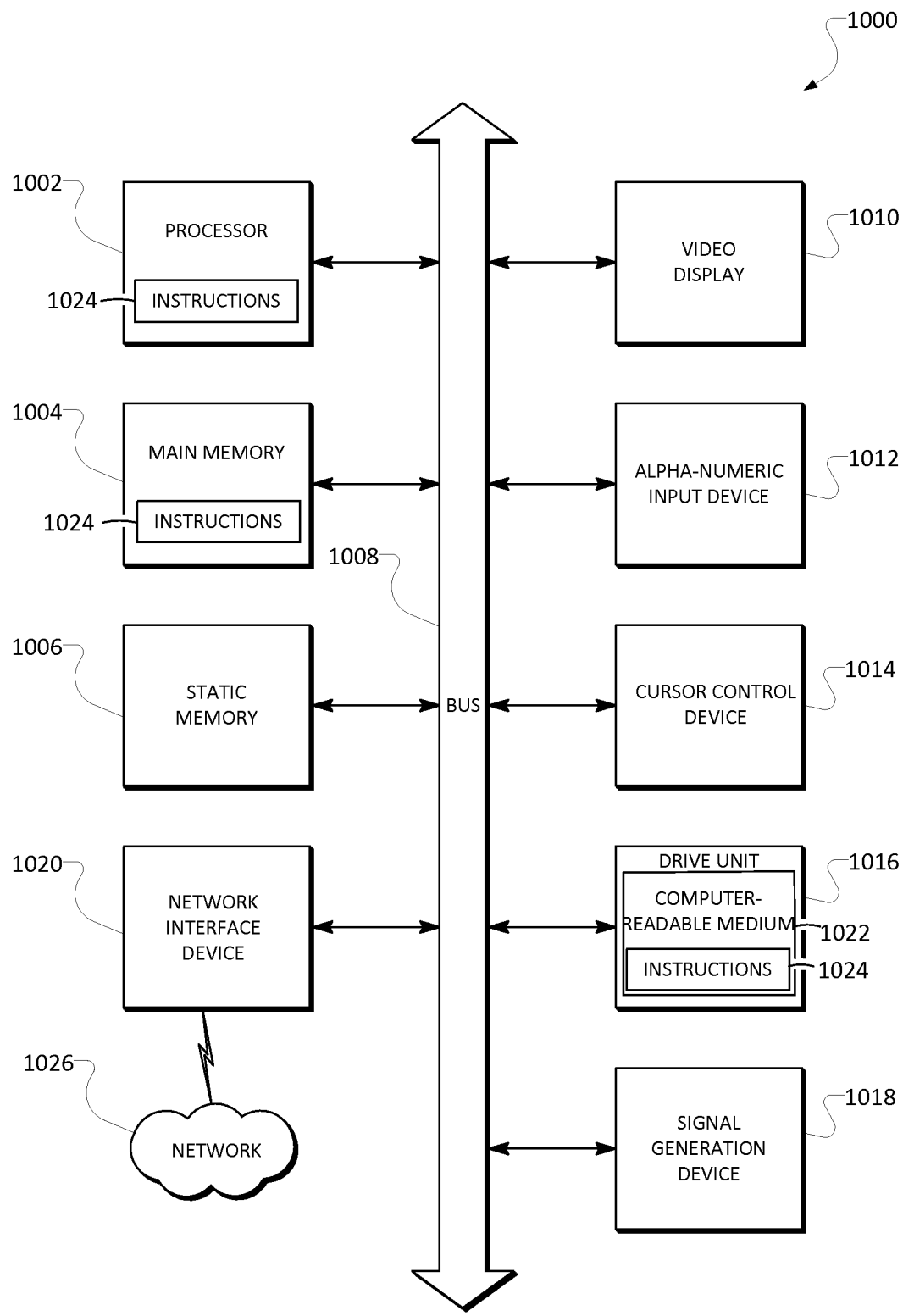
FIG. 10 is a block diagram of machine in the example form of a computer system within which instructions, for causing the machine to perform any one or more of the methodologies discussed herein, may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI)

navigation device 1014 (e.g., a mouse), a disk drive unit 1016, a signal generation device 1018 (e.g., a speaker) and a network interface device 1020.

Machine Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions 1024 for execution by the machine and that cause the machine to perform any one or more of the methodologies of the presentdisclosure or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for operating a user device, the method comprising:

downloading, from a server to the user device, a container, the container being an application natively executable by a first operating system of the user device, the container including:

a container service including one or more libraries of functions designed by a container designer to natively operate on the first operating system;

a browser;

container metadata defining functions of the application, the functions compatible with the container service for the first operating system and also compatible with a container service for a second operating system; and a plug-in including one or more additional libraries of functions designed by an entity other than the container designer to perform additional native operations on the first operating system, the plug-in providing more simplified access to a native function of the user device than is provided by native function calls of the user device;

storing the container on the user device; and executing, on the user device, the container metadata using the browser, causing function calls to the container service and plug-in and thus controlling native functions of the user device.

2. The method of claim 1, wherein the plug-in provides access to a camera of the user device.

3. The method of claim 1, wherein the plug-in provides access to an accelerometer of the user device.

4. The method of claim 1, wherein the plug-in provides access to a contact list of the user device.

5. The method of claim 1, wherein the container metadata is designed in an open, standards-based protocol.

6. The method of claim 1, wherein the plug-in is a logon plugin that provides a login screen where a user can enter values needed to connect to a server, which stores those values in a secure data vault.

7. The method of claim 1, wherein the plug-in is a settings plug-in that provides the ability to trigger an operation on a server to allow an application to store device and user settings on the client device for later use.

8. The method of claim 1, wherein the plug-in is an application update plug-in that provides server-based updates to application content and manages processes of checking, downloading, and installing updates to the application.

9. The method of claim 1, wherein the plug-in is an authorization proxy plug-in that automates a process of accepting certificates returned by a call to a web resource.

10. The method of claim 1, wherein the plug-in is a logger plug-in allowing an application designer to log messages.

11. The method of claim 1, wherein the plug-in is a push notification plug-in that enables notification capability for applications.

12. A method for designing an application to be executed on user devices having different operating system, the method comprising:
    downloading a container for a first operating system, the container for the first operating system including a container service including one or more libraries of functions designed by a container designer to natively operate on the first operating system, and a browser;
    downloading a first plug-in, the first plug-in including one or more additional libraries of functions designed by an entity other than the container designer to perform additional native operations on the first operating system the first plug-in providing more simplified access to a native function of a user device than is provided by native function calls of the user device;
    defining container metadata specifying functions on the application and containing calls to the libraries in the container service for the first operating system and the first plug-in;
    building a first version of the application from the container for the first operating system, the first plug-in, and the container metadata;
    downloading a container for a second operating system, the container for the second operating system including a container service including one or more libraries of functions designed by the container designer to natively operate on the second operating system, and a browser;
    downloading a second plug-in, the second plug-in including one or more additional libraries of functions designed by an entity other than the container designer to perform additional native operations on the second operating system; and
    building a second version of the application from the container for the second operating system, the second plug-in, and the container metadata.

13. The method of claim 12, further comprising registering the first version of the application and the second version of the application with an app store for distribution to user devices.

14. A user device comprising:
    a processor;
    a memory;
    a first operating system;
    a container, stored in the memory and executable by the processor, the container including
        a container service including one or more libraries of functions designed by a container designer to natively operate on the first operating system;
        a browser;
        container metadata defining functions of an application, the functions compatible with the container service for the first operating system and also compatible with a container service for a second operating system; and
        a plug-in including one or more additional libraries of functions designed by an entity other than the container designer to perform additional native operations on the first operating system, the plug-in providing more simplified access to a native function of the user device than is provided by native function calls of the user device;
    the processor configured to run the browser using the container metadata, causing function calls to the container service and plug-in and thus controlling native functions of the user device.

15. The user device of claim 14, wherein the user device is a wireless mobile device.

16. A non-transitory machine-readable storage medium comprising instructions, which when implemented by one or more machines, cause the one or more machines to perform operations comprising:
    downloading, from a server to the user device, a container, the container being an application natively executable by a first operating system of the user device, the container including:
        a container service including one or more libraries of functions designed by a container designer to natively operate on the first operating system;
        a browser;
        container metadata defining functions of the application, the functions compatible with the container service for the first operating system and also compatible with a container service for a second operating system; and
        a plug-in including one or more additional libraries of functions designed by an entity other than the container designer to perform additional native operations on the first operating system, the plug-in providing more simplified access to a native function of the user device than is provided by native function calls of the user device;
    storing the container on the user device; and
    executing, on the user device, the container metadata using the browser, causing function calls to the container service and plug-in and thus controlling native functions of the user device.

17. The non-transitory machine-readable storage medium of claim 16, wherein the plug-in provides more simplified access to a native function of the user device than is provided by native function calls of the user device.

18. The non-transitory machine-readable storage medium of claim 16, wherein container metadata is designed in an open, standards-based protocol.

19. The non-transitory machine-readable storage medium of claim 16, wherein the plug-in is an authorization proxy plug-in that automates a process of accepting certificates returned by a call to a web resource.

* * * * *